United States Patent [19]

Hofmann et al.

[11] Patent Number: 4,545,530

[45] Date of Patent: Oct. 8, 1985

[54] FUEL INJECTION NOZZLE FOR INTERNAL COMBUSTION ENGINES

[75] Inventors: Karl Hofmann, Remseck; Dietrich Trachte, Kornwestheim, both of Fed. Rep. of Germany

[73] Assignee: Robert Bosch GmbH, Stuttgart, Fed. Rep. of Germany

[21] Appl. No.: 617,845

[22] Filed: Jun. 7, 1984

Related U.S. Application Data

[63] Continuation of Ser. No. 404,807, Aug. 3, 1982, abandoned.

[30] Foreign Application Priority Data

Sep. 23, 1981 [DE] Fed. Rep. of Germany ....... 3137761

[51] Int. Cl.[4] ...................... F16C 37/00; G01M 15/00

[52] U.S. Cl. .................................. 239/73; 73/119 A; 137/554; 239/533.3

[58] Field of Search ................ 239/71, 73, 533.3, 585; 73/119 A; 137/554

[56] References Cited

U.S. PATENT DOCUMENTS 3,379,214 4/1968 Weinberg ........................ 251/141 X 4,362,050 12/1982 Stump et al. ..................... 73/119 A

*Primary Examiner*—Andres Kashnikow

*Assistant Examiner*—Kevin Patrick Weldon

*Attorney, Agent, or Firm*—Edwin E. Greigg

[57] ABSTRACT

A fuel injection nozzle for internal combustion engines having an inwardly opening valve needle (I nozzle) is proposed, in which an induction coil is disposed in the closing spring chamber, the induction coil together with an armature influenced by the valve needle forming a signal transducer for a measuring appliance for detecting the onset of injection and further data, as needed, of the injection process. The air gap of the magnetic circuit of the induction coil is formed between the armature and a coil, toward which the armature moves during the opening stroke of the valve needle. As a result, it is possible to attain a small initial air gap and a large change, in terms of percentage, in the air gap. The apparatus according to the invention is particularly suitable for measuring circuits in which a direct voltage is applied to the induction coil and the voltages induced as a result of the air gap changes in the induction coil are superimposed on the applied direct voltage.

6 Claims, 3 Drawing Figures

FUEL INJECTION NOZZLE FOR INTERNAL COMBUSTION ENGINES

This is a continuation of copending application Ser. No. 404,807, filed Aug. 3, 1982, now abandoned.

BACKGROUND OF THE INVENTION

The invention is based on a fuel injection nozzle for internal combustion engines. In a known injection nozzle of this type (German Auslegeschrift No. 10 49 635), two induction coils are disposed coaxially with one another, each being provided with a central opening passing through it and into which an armature dips under the influence of the valve needle. The two armatures are embodied by two magnetically conductive longitudinal sections of one through bore, the sections being separated from one another by an intermediate section of magnetically nonconductive material. The two induction soils are disposed in the measurement branch of a bridge of an appliance functioning with carrier frequency modulation. This arrangement requires two induction coils and is also relatively expensive in terms of the other elements of the measuring circuit. It is furthermore either not possible or possible only with additional circuit elements to generate an abrupt change in inductivity of the coil at the onset of the opening stroke and at the end of the closing stroke of the valve needle, and in this manner to detect precisely the onset and the end of an injection procedure.

OBJECT AND SUMMARY OF THE INVENTION

The apparatus according to the invention has the advantage over the prior art that only one induction coil is required and that substantially larger changes in terms of percentage of the air gap can be attained than in the case of the known device which lacks a stationary central core, so that less expense is required for signal amplification in the measuring circuit as well.

By means of the further characteristics disclosed hereinafter, advantageous additional embodiments of the apparatus revealed in the application can be attained.

It is particularly advantageous if the faces on the coil core and armature defining the air gap are disposed such that at least in a partial range of the air gap area, the air gap is reduced to its minimum length after only a partial stroke of the armature has been executed. It is thereby attained that the onset and end of an injection procedure can be detected exactly.

To this end, it is further proposed that the air gap be formed between the end faces facing one another of the coil core and armature, and that the coil core is supported counter to spring force in the housing of the induction coil. With this apparatus, a particularly small initial air gap can be adjusted, which may be for instance from one-quarter to one-eighth of the total opening stroke of the valve needle, without restricting the stroke movement of the valve needle. It is thereby assured that the signal feed, compressed to the shortest possible period of time, in fact is effected at the onset of the opening stroke and at the end of the closing stroke of the valve needle. Another opportunity of varying the air gap greatly to an overproportional extent already at the onset of the opening stroke of the valve needle such that the magnetic resistance is reduced in accordance with the invention in that the initial air gap is formed by an annular gap between the bore wall of a magnetically conductive annular plate resting on the induction coil and the jacket face area at the end of the coil core dipping into the bore of the ring plate, and that the armature is embodied as a hollow piston, the annular wall of which enters into the annular gap during the opening stroke of the valve needle and once the valve needle has completed its full stroke fills this annular gap except for a radial play which forms the remnant air gap.

A simple measuring circuit is attained if the induction coil can be connected to a source of direct voltage and the voltage induced by means of the change in the air gap is measurably superimposed on the applied direct voltage.

The invention will be better understood and further objects and advantages thereof will become more apparent from the ensuing detailed description of two preferred embodiments taken in conjunction with the drawings.

DESCRIPTION OF THE PREFERRED EMBODIMENTS

Figure 1:
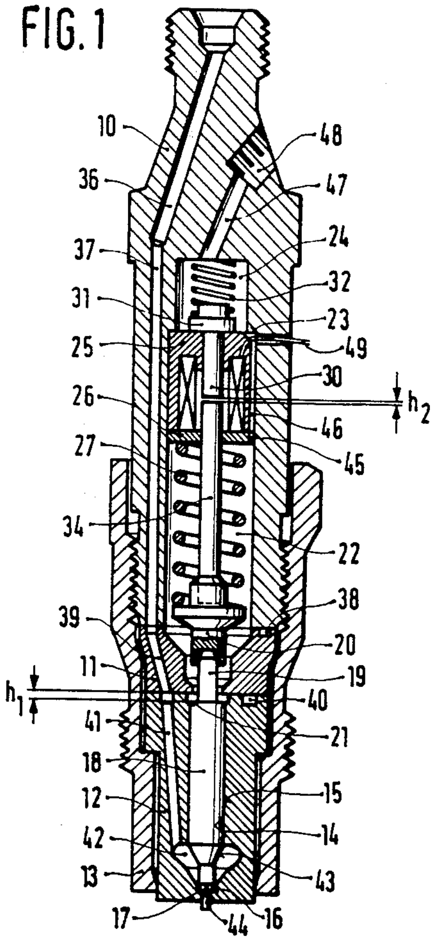
FIG. 1 shows the first exemplary embodiment of the invention in cross section.

The injection nozzle shown in FIG. 1 has a nozzle holder 10, and an intermediate plate 11 and a nozzle body 12 are clamped against the nozzle holder 10 by means of a sleeve nut 13. A guide bore 14 for receiving a valve needle 15 and a valve seat 16 are formed in the nozzle body 12; the valve seat 16 being arranged to cooperate with a sealing cone 17 on the valve needle 15. Adjoining the sealing cone 17 is a needle shaft 18 of larger diameter and sliding in the guide bore 14 as well as a pressure tang 19. A pressure piece 20 is seated on the pressure tang 19 and surroundingly engages the pressure tang 19 with the required amount of play by means of an annular collar which points downwardly. The annular shoulder 21 on the valve needle 15 formed between the needle shaft 18 and the pressure tang 19 is distanced from the intermediate plate 11 by the dimension $h_1$ when the valve needle is seated on the valve seat 16. This dimension corresponds to the total stroke of the valve needle 15, which is limited by the intermediate plate 11.

A spring chamber 22 open at one end and having a shoulder 23 as well as a blind bore 24 of smaller diameter are cut out within the nozzle holder 10. An induction coil 25 provided with a magnetically conductive housing, a plate 26 comprising soft iron, and a closing spring 27 for the valve needle are inserted into the spring chamber 22. The closing spring 27 engages the pressure piece 20 and is supported via the plate 26 and the housing of the induction coil 25 on the shoulder 23 of the nozzle holder 10. As a result, the induction coil 25 is held firmly, such that it cannot be shaken, on the shoulder 23 and simultaneously the plate 26 is caused to rest without a gap on the open end rim of the housing of the induction coil 25.

The housing of the induction coil 25 is made of soft iron and it guides a core bolt 30 with little play, this bolt 30 also being of magnetizable material and protruding to some distance into the inner bore of the induction coil 25. The core bolt 30 is provided with an annular collar 31, which is engaged by a helical spring 32 supported on the bottom of the blind bore 24. The helical spring 32 has the tendency to press the core bolt 30 downward and to hold it in the illustrated position, in which the annular collar 31 rests on the end of the induction coil 25.

An armature bolt 34 of magnetically conductive material is threaded into the pressure piece 20 and passes through the plate 26 with a narrow guide clearance and protrudes into the inner bore of the induction coil 25 to such an extent that an air gap $h_2$ remains between the end of the armature bolt 34 and the end of the core bolt 30. The magnetic circuit of the induction coil 25 leads across this air gap $h_2$ and outside the air gap $h_2$ passes through the housing of the induction coil 25, the plate 26, the end section of the armature bolt 34 which passes through the plate 26, and the core bolt 34. The elements are dimensioned such that when the valve 16, 17 is closed and when the collar 31 of the core bolt 30 is resting on the induction coil 25, the air gap $h_2$ is smaller than the valve needle stroke $h_1$. In a preferred exemplary embodiment, the air gap $h_2$ is approximately one fifth as long as the valve needle stroke $h_1$.

The supplied fuel passes via bores 36 and 37 in the nozzle holder 10 into an annular groove 38 on the end of the intermediate plate 11 and from there travels on via a bore 39 in the intermediate plate 11, an annular groove 40, and a bore 41 in the nozzle body 12, into a pressure chamber 42, which surrounds the valve needle 15 in the vicinity of a pressure shoulder 43. From the pressure chamber 42, the fuel passes through the valve 16, 17, into an injection port 44 and from there into the combustion chamber of the engine. The quantity of leaking oil which reaches the spring chamber 22 via the guide gap of the valve needle 15 is capable of passing through axial grooves 45 and 46 in the plate 26 and in the housing of the induction coil 25 into the blind bore 24, from whence a conduit 47 leads to a threaded hole 48 intended for connecting a leakage oil line.

The induction coil 25 is connected via lines 49 to a source of direct current and to a device for evaluating the voltages induced in the induction coil during operation, these voltages being superimposed on the applied direct voltage. Directly following the beginning of the opening stroke of the valve needle 15, the initial air gap $h_2$ is reduced to a zero value, so that precisely at the correct time a clearly pronounced, abrupt change in the magnetic flux and the resultant voltage is produced, this being evaluatable by a simple means. As the valve needle 15 continues its stroke, the core bolt 30 is carried along upward by the armature bolt 34, whereupon the helical spring 32 holds the contact bolt 30 against the armature bolt 34. During the closing stroke of the valve needle 15, the elements 30 and 34 at first remain resting on one another until shortly before the end of the stroke at which time the annular collar 31 strikes the induction coil 25, and the core bolt 30 is prevented from making any further movement. Subsequently, the elements 30 and 34 are quickly separated from one another, and the initial air gap $h_2$ is re-established, whereupon—again at the correct moment—the evaluation circuit is supplied with a clearly defined signal.

Figure 2:
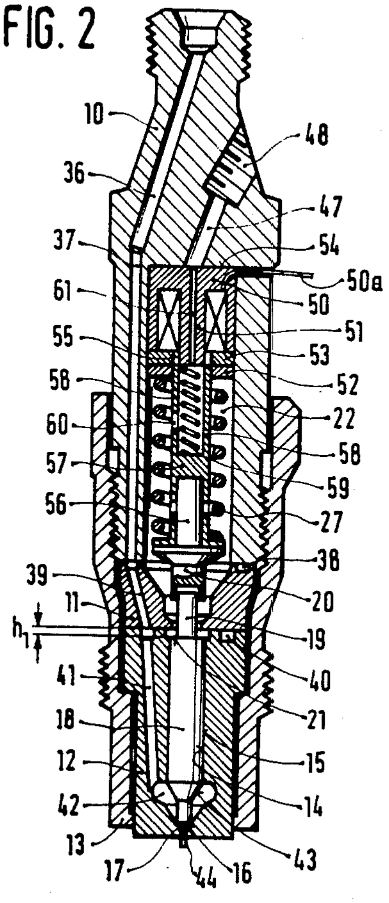
FIG. 2 shows the second exemplary embodiment in cross section.

The injection nozzle according to FIG. 2 differs in a practical sense from that of FIG. 1 only by the different structure of the means detecting the stroke and generating signals. For this purpose, this embodiment provides an induction coil 50 having connecting lines 50*a*, the housing, of soft iron, being provided with a central core protrusion 51 molded onto it. The closing spring 27 is supported via a guide plate 52 of nonmagnetizable material, an annular plate 53 of soft iron and the housing of the induction coil 50 on the base 54 of the spring chamber 22. A recess corresponding to the blind bore 24 of FIG. 1 is not provided in the injection nozzle according to FIG. 2 so that this latter injection nozzle is somewhat shorter in overall structure than the embodiment of FIG. 1.

The core protrusion 51 of the induction coil 50 reaches into the central bore of the annular plate 53, which is dimensioned such that a defined annular gap 55 results between the core protrusion 51 and the bore wall of the annular plate 53. The magnetic circuit of the induction coil 50 leads via the housing thereof together with the core protrusion or nose 51, via the perforated annular plate 53 and radially through the annular gap or zone 55, which corresponds to the initial air gap of the magnetic circuit. The pressure piece 20 is provided with an axial protrusion 56, on which a hollow piston 57 of magnetically conductive material is mounted to act as an armature. The hollow or tubular piston 57 is additionally radially guided within the guide disk 52. The hollow piston 57 could also be embodied in one piece with the pressure piece 20. The outer diameter and the inner diameter of the hollow piston 57 are dimensioned such that its annular wall 58 is capable of entering into the annular gap 55 with a slight radial play. A helical spring 59 disposed in the hollow piston 57 is supported on the core protrusion 51 and has the tendency to keep the hollow piston resting on the pressure piece 20. The elements are dimensioned such that when the valve 16, 17 is closed, the upper end face of the hollow piston 57 is located in approximately the same plane as is the lower end face of the annular plate 53.

For the purpose of carrying away leakage oil from the spring chamber 22, a radial bore 60 is provided in the hollow piston 57 and a central bore 61, which discharges into the conduit 47 leading to the threaded hole 48, is provided in the core protrusion 51 of the coil housing. The induction coil 50, as in the exemplary embodiment of FIG. 1, can be connected to a source of direct current and to a signal evaluation circuit.

Upon the opening stroke of the valve needle 15, the hollow piston 57 enters into the annular gap 55 and fills up this gap entirely at the end of the opening stroke except for a slight amount of radial play required for free mobility of the hollow piston. In this manner, in this exemplary embodiment as well, a large change, in terms of percentage, in the air gap is attained beginning at an initial air gap which is already relatively small. As a result of the special feature that even at the onset of the opening stroke a portion of the air gap lines is shortened, except for the slight radial mobility play, about the annular wall 58 of the hollow piston 57, then in this embodiment as well there is an overproportionally large change at the outset end of the stroke in the magnetic resistance in the magnetic circuit of the coil.

Figure 3:
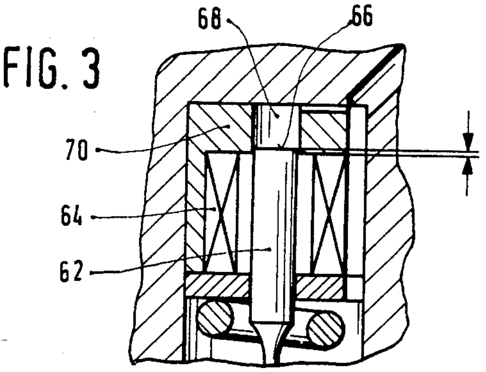
FIG. 3 shows a modified cross-sectional enlarged detail view of the armature area of FIG. 2.

The modified embodiment of FIG. 3 provides that an armature shaft 62 connected with the valve closing member passes all the way through the central bore of the induction coil 64, and in the closing position of the valve this armature shaft 62 is located with its free end rim 66 at the beginning of a bore or perforation 68 in the housing base 70 of the induction coil 64. Upon the opening of the valve, the air gap in the bore 68 is increasingly reduced, as a result of which the desired signal is formed in turn.

The foregoing relates to preferred exemplary embodiments of the invention, it being understood that other embodiments and variants thereof are possible within the spirit and scope of the invention, the latter being defined by the appended claims.

What is claimed and desired to be secured by Letters Patent of the United States is:

1. A fuel injection nozzle for internal combustion engines, having a nozzle body in which a valve seat is formed, a valve needle cooperating with said valve seat is displaceably guided during opening and closing, said valve needle being acted upon by a closing spring and, in the opposite direction therefrom, by a fuel under pressure and upon an opening stroke moving counter to a flow direction of the fuel, a nozzle holder secured relative to said nozzle body by a sleeve nut, said nozzle holder including a chamber for receiving the closing spring and an induction coil, an armature influenced by said valve needle and associated with said induction coil for the purpose of producing a signal in accordance with the valve needle stroke, characterized in that a magnetic circuit of said induction coil leads via a body disposed axially adjacent the induction coil, which body is provided with a central bore having a wall, and said armature is embodied as a piston, which in the opening position of the valve needle protrudes to some distance into the bore, wherein the radial play between the wall of said body bore and the piston forms the smallest remnant air gap of the magnetic circuit.

2. An injection nozzle as defined by claim 1, characterized in that said body disposed axially adjacent the induction coil and having the bore is a support axially covering one end of said induction coil.

3. An injection nozzle as defined by claim 2, characterized in that the induction coil is provided with a magnetizable coil core having an end face, which protrudes into the bore of the support covering one end of the induction coil, and that the armature is embodied as a hollow piston, an annular wall of which, upon the opening stroke of the valve needle moves into an annular gap between the bore wall of said body and the coil core.

4. An injection nozzle as defined by claim 3, characterized in that a spring is disposed in the armature embodied as a hollow piston, the spring being supported on the end face of the coil core.

5. An injection nozzle as defined by claim 2, characterized in that said support provided with the bore is embodied by the coil housing remote from the valve seat, and the armature extends all the way through the induction coil.

6. An injection nozzle as defined by claim 1, characterized in that the induction coil is connectable to a source of direct voltage, and the voltage induced by the variation of the air gap is superimposed in a measurable manner on the direct voltage applied.

* * * * *